Dec. 13, 1955 R. L. BUSBY 2,726,689
MOTOR ATTACHMENT DEVICE FOR POWER TOOLS
Filed March 30, 1953
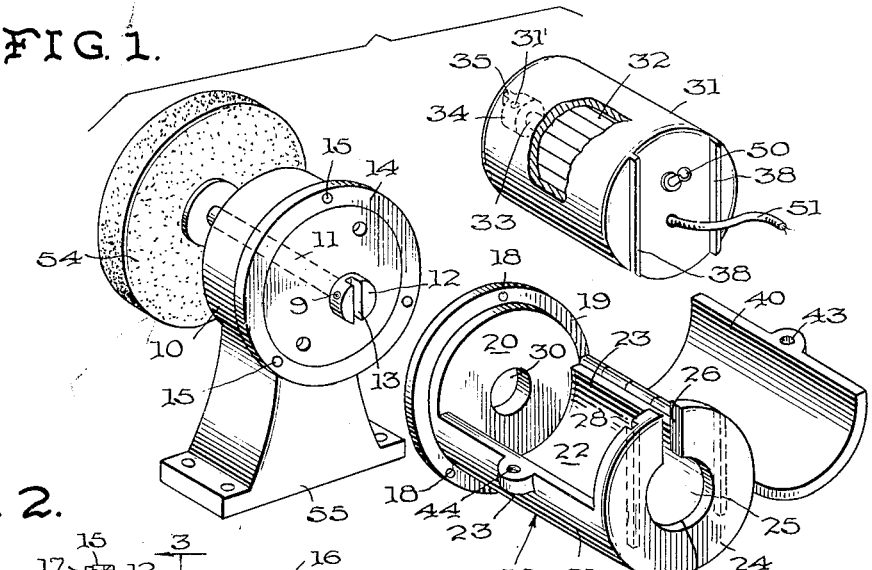
FIG. 1.
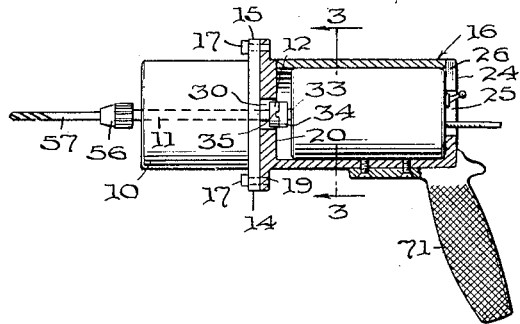
FIG. 2.
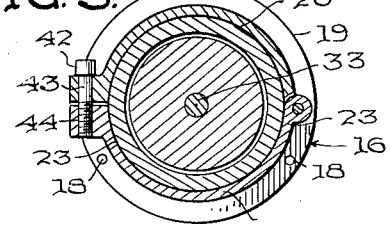
FIG. 3.
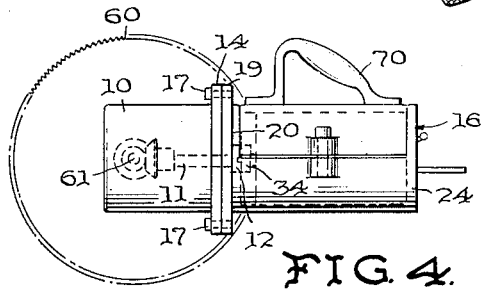
FIG. 4.
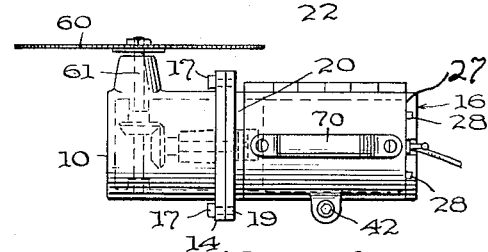
FIG. 5.
FIG. 6.
INVENTOR.
ROBERT L. BUSBY
BY John S. Rhoades
ATTORNEY

United States Patent Office 2,726,689
Patented Dec. 13, 1955

2,726,689

MOTOR ATTACHMENT DEVICE FOR POWER TOOLS

Robert L. Busby, Washington, D. C.

Application March 30, 1953, Serial No. 345,667

4 Claims. (Cl. 144—1)

This invention relates to motor means for operating power tools such as electric drills, saws, sanders, hedge clippers and the like. More particularly it is concerned with providing a novel arrangement for mounting and connecting a common motor means to various kinds of power tools, whereby the same motor means may be used with each of the power tools and the use of a separate motor means for each power tool can be eliminated.

Various devices have been proposed in the past for use as the common motor means for a variety of power tools both of the portable type and those of the fixed bench variety. These, however, have not proven completely satisfactory. One of the reasons for this is that the elements employed for coupling the motor means involved the use of complicated coupling and connecting members which, at best, only loosely coupled the electric motor to the power tool and not with the precision required. As a result, these power tools were very difficult and awkward to handle and manipulate and it was thus impossible to utilize them with the maximum amount of efficiency. Furthermore, these coupling members usually never coupled the motor element directly to the shaft for driving the power tool so that there was a wastage of power from the motor and thus motors of greater size and power capacity than was necesary had to be employed.

For example, it has been proposed to use the electric motor mounted in a hand drill casing as the same power means for driving a rotating saw by using a special coupling member and other fittings for attaching the drill chuck or holder and the motor therefor to the saw. In use, however, it was found that this coupling was too long to permit direct and precise attachment between the drill motor and the gears attached directly to the shaft for driving the saw with the result that there was slippage between the motor shaft and saw blade during the operation of the saw. Consequently, the use of the same for many cutting operations was found to be impractical.

Furthermore, because of the complex construction of the special coupling members and the various fittings therefor, it was extremely difficult to connect them with any amount of precision to the power tools and make them work properly without the use of special tightening wrenches, etc. These coupling members and other working parts were also usually exposed which made handling of the tools hazardous.

It has been found, however, that when a novel means for mounting a common electric motor housing or casing such as that of the instant invention is provided, all of the aforesaid difficulties in prior power tool construction are eliminated. In addition, the overall manufacturing cost of various power tools can be materially reduced.

The novel mounting means of the instant invention allows the usage of simple and direct coupling members for connecting and attaching a motor element such as an electric motor directly to the tool to be operated, so that all the power from the motor is efficiently used and wastage of power minimized. Thus a common electric motor can be interchangeably utilized with fixed bench tools or portable tools. The overall result is that each power tool may be simply and compactly constructed and it lacks the cumbersomeness which has been one of the major objections and drawbacks of prior power tools.

The novel mounting means of the instant invention makes the handling and manipulation of various power tools even by the unskilled easy. Only one electric motor is needed to operate a variety of different power tools, so the cost of each of the tools can be materially reduced. The simple parts making up the power tool can be quickly assembled without the need of any special skill or the purchasing of special wrenches, etc. Furthermore, all of the moving parts of the tool with the exception of the working performing element thereon are effectively concealed. The operator can thus freely handle various parts of the tool without risk of injury, all of which materially increases the usefulness and efficiency of each tool.

Accordingly, it is an object of this invention to provide a novel means for mounting a common electric motor on a variety of power tools and for connecting the motor to each of the tools.

It is a further object of this invention to provide novel means for securing a common electric motor to a variety of power tools, and for directly connecting the motor shaft to the tool shaft.

It is another object of this invention to provide novel means for connecting an electric motor to either a power tool of the fixed bench variety or to a portable hand power tool.

It is a further object of this invention to provide novel means for mounting a common electric motor in a simple, yet efficient fashion to a variety of different power tools, wherein the proper coupling of the motor shaft to the power tools shaft will be insured.

It is another object of this invention to provide novel means for attaching a common electric motor to a variety of power tools whereby each of the power tools and the motor itself can be inexpensively manufactured.

It is another object of this invention to provide novel means for attaching a common electric motor to a variety of power tools in such a fashion that all working or moving parts of the tool with the exception of the work performing element itself are effectively shielded from the hands of the operator.

It is a further object of this invention to provide novel means for mounting a common electric motor on a variety of power tools, whereby the electric motor may be easily and quickly mounted or removed from the power tool with a minimum amount of time and effort and without the need of special wrenches or other instruments.

These and other objects of the instant invention are accomplished by fabricating a power tool in such a fashion that it is provided with a suitable housing for the gears, shafts, etc., for the work performing member of the tool. A motor receptacle or holder is then detachably connected to this housing. Means are provided such as projecting mating flanges on the housing and motor receptacle for connecting the two together. The end wall of the motor receptacle which is farthest removed from the aforesaid housing, is advantageously provided with one or more slotted portions projecting downwardly in a direction transverse to the normal axis of the receptacle. An electric motor housing provided with one or more projecting ribs on the outer surface thereof and at one end of the housing is then fitted within the motor receptacle in such a way that at least one rib will fit within a slot in the end wall of the motor mount or receptacle. A cover member is also pivotally attached to one side of the receptacle and when this cover is pivoted upwardly about the motor housing and locked to the other side of the receptacle, the electric motor and housing therefor will be securely clamped in position. As the motor housing or casing is slipped within the receptacle, a simple coupling member projecting from the part of the motor casing which is closest to the housing for the work performing member of the tool can be slid into simple but efficient contact with and locked to the coupling member attached to the work performing member of the tool, without the use of external tools such as wrenches, etc.

Other objects and advantages of the instant invention will become more apparent by reference to the following detailed description, when taken in conjunction with the appended drawings, wherein:

Figure 1 is an exploded perspective view of an electric motor and a receptacle therefor and indicates the novel arrangement for attaching the same to a bench grinding wheel or the like;

Figure 2 is a side elevational view partially in section of a power drill of the portable type and indicates the novel arrangement for attaching the motor and receptacle of Figure 1 thereto;

Figure 3 is a sectional view of the motor receptacle or mount of the instant invention when taken along lines 3—3 of Figure 2;

Figure 4 is a side elevational view of a power saw showing the novel arrangement for attaching the motor and receptacle of Figure 1, thereto;

Figure 5 is a plan view of the power saw and motor attachment shown in Figure 4; and, Figure 6 is a side elevational view partially in section of a hedge trimmer and indicates the novel arrangement for attaching the motor and motor receptacle of Figure 1 thereto.

With reference to the drawings and particularly Figure 1, each of the power tools, of which only a few are shown for the purposes of illustration, contemplates the use of a suitable gear box or housing 10 for housing the various parts of the power tool which are directly attachable to the working member of the tools such as the tool power shaft 11 and gears, the latter of which are not shown or described in detail since they do not form any part of the instant invention.

Removably affixed to the free extremity of power shaft 11, which projects a short distance out of the housing 10, by means of the set screw 9, is a coupling member 12 having an elongated recess or groove 13 therein. Housing 10 is also provided with an annular mating flange 14, located on the outside periphery of the housing 10 and at the end of housing 10 adjacent the free extremity of the shaft 11 which has the coupling member 12 located thereon.

A plurality of spaced openings 15 are located in the annular flange 14. A motor mount or receptacle 16 is adapted to be removably fastened to the housing or casing 10 when bolts 17 are inserted in the openings 15 in the annular flange 14 on the housing 10 and the threaded openings 18 in the corresponding annular mating flange 19, which forms part of one of the end walls 20 of the motor receptacle 16 upon the alignment of the several openings 15 and 18.

Receptacle 16 also includes an arcuate portion 21 which constitutes the bottom 22 and side portions 23 of the receptacle. Receptacle 16 is further provided with a second circular end wall 24 suitably spaced from wall 20. Centrally located within wall 24 is an opening 25 and this opening 25 is in open communication with the open slotted portion 26 in the wall. The inside surface 27 of wall 24 has one or more elongated grooves 28 formed therein. Wall 20 of receptacle 16 is also provided with a central aperture 30 through which the coupling member 12 is adapted to be projected so that it will be located or positioned within the motor receptacle 16 when receptacle 16 and housing 10 are tied together by means of the bolts 17.

A motor casing 31 for the electric motor 32 is adapted to be fitted snugly within the receptacle 16. The motor shaft 33 projects a short distance out of that part of the casing 31 which is located adjacent wall 20 thereof and removably attached to this part of shaft 33 by means of the set screw 31' is the male coupling member 34 provided with a tongue 35. This tongue 35 may be easily slipped into the recess or groove 13 on coupling member 12 provided both the groove 13 and tongue 34 are located in a straight up and down position at the time the motor casing 31 is slipped within the receptacle 16. The end of the motor casing 31 which is located near wall 24 in receptacle 16 is advantageously provided with one or more projecting ribs 38. Each of these ribs 38 will fit within one of the elongated grooves 28 located on the inner surface 27 of the upstanding end wall 24 at the same time the motor casing 31 is fitted within the receptacle 16. By this arrangement, the motor casing 31 will become firmly and securely locked within the receptacle 16 with a minimum amount of effort and time.

After the motor casing 31 has been fastened within the receptacle 16, the cover member 40 which may be advantageously pivotally attached to one of the side walls 23 of the receptacle, is swung over and about the motor casing 31 so as to complete the locking of the motor casing 31 within the receptacle 16. Any suitable means may be used to hold the cover member 40 in place. For example, a simple spring latch may be used, or as indicated in the drawings, the cover member 40 may be held in place by means of the bolt 42 which projects through the openings 43 and 44 in the cover member 40 and the other side wall 23 of the receptacle 16, and threadedly engages the interiorly threaded opening 44.

It is also to be understood that any suitable switch means may be used for stopping and starting the electric motor 32, such as for example, the simple hand switch 50. When the motor casing 31 is placed within the receptacle this switch 50 as well as the electric cord 51 which is connectable to a suitable source of power, will both easily slide through the slotted portion or keyway 26 until they become located within the central opening 25 in wall 24, where they then can be easily reached and manipulated by hand.

As indicated in Figure 1, the power shaft 1 may be attached to a grinding wheel 54 which would be considered a power tool of the fixed bench variety, in which case, it is contemplated that housing 10 would also be provided with a base member 55, which could be permanently fixed to a workbench.

In Figure 2, shaft 11 is shown as being connected to the chuck 56 for the drill 57. In Figures 4 and 5, shaft 11 is shown as being connected to the simplified gear train for driving the power saw 60 mounted directly on shaft 61 after the receptacle 16 has been removably attached to the housing 10 of the saw gearing. In Figure 6, shaft 11 is shown as being connected to bevel gear 62 meshing with another bevel gear 63 to which the connecting rod 64 is also attached. This connecting rod 64 in turn is connected to the reciprocating blade 65 of a hedge trimmer 66.

In some instances, depending of course on the particular manner in which a power tool is to be operated, the cover member 40 attached to receptacle 16 may be provided with a handle 70, as for example in the case of the cover member 40 for the power saw shown in Figures 3 and 4. In the case of the drill member shown in Figure 2, means may be provided for attaching a pistol grip 71 to the bottom of the receptacle.

It will be obvious from the aforesaid description that a novel means has been provided for mounting the same common electric motor on a variety of power tools and for connecting the motor directly and simply to the tools. The motor is attached to the tool by direct short and simple coupling members. The various parts of the tools can be readily assembled and dismantled for the purposes of storage or repair. All working parts of the tool with the exception of the work performing member of the tool are effectively shielded from the hands of the operator and risk of injury is minimized.

In short, novel means are provided by the instant invention whereby a common portable motor may be attached to a multiplicity of tools such as a bench grinding wheel, lathe, or to portable power tools such as a hand drill by simply placing the portable motor within a receptacle or shell after the shell has previously been removably attached to a suitable housing for the parts of the tool directly connectable to the work performing member. The purchaser of the power tools need buy but one electric motor and one motor mount or receptacle to which the working members of a variety of power tools can be simply but efficiently connected. The savings in cost is obvious.

It is also obvious that various changes and modifications may be made in the invention without departing from the spirit and scope thereof as defined by the appended claims, wherein what is claimed is:

1. A power tool of the type described comprising the combination of a work performing member, means including a drive shaft for operating the work performing member, a housing for said means including said shaft, a mating flange on said housing, an open-topped receptacle also provided with a mating flange removably attached to the mating flange on the said housing, a coupling member on said drive shaft for said work performing member and projecting a short distance within said receptacle upon the attachment of said receptacle to said housing when the mating flanges thereon are tied together, an end wall on said receptacle, the inner surface of which is provided with a recess projecting downwardly toward the bottom of said receptacle, a motor casing removably disposed within the said receptacle, said casing being provided with a projecting rib insertable within the recess in the wall of the receptacle, electric motor means including a motor shaft in axial alignment with the drive shaft for the work performing member located within the casing, and means for attaching the motor shaft to the coupling on the drive shaft for the work performing member.

2. The combination defined in claim 1, including a cover member pivotally attached to one side of the receptacle and adapted to be swung over the motor casing and locked to the opposite side of the receptacle when the motor casing has been disposed within the receptacle.

3. In a power tool comprising a work performing element, the combination of primary means for operating a work performing element including a drive shaft and a coupling having an elongated recess thereon attached to the said shaft, a housing for the said first mentioned means including said shaft, an open-topped receptacle removably attached to the said housing, said receptacle being provided with a wall, the inner surface of which has a recess projecting downwardly toward the bottom of the receptacle, a motor casing removably disposed within the receptacle, said casing being provided with a projecting rib insertable within the recess in the wall of the said receptacle, electric motor means including a motor shaft located within the casing, and means for attaching the motor shaft to the drive shaft for the work performing member of the tool, said means including a coupling on the said motor shaft, said coupling in turn having a tongue insertable within the recess on the coupling for the drive shaft of said work performing element.

4. A power tool of the type described comprising the combination of a work performing member, means including a drive shaft and a coupling having an elongated recess thereon for operating the said work performing member, a housing for said means including said shaft, a mating flange on the said housing, an open-topped receptacle also provided with a mating flange removably attached to the mating flange on the said housing, said coupling member on the drive shaft for said work performing member being adapted to project a short distance within the said receptacle upon the attachment of said receptacle to the said housing, when the mating flanges thereon are tied together, an end wall on said receptacle, the inner surface of which is provided with a recess projecting downwardly toward the bottom of said receptacle, a motor casing removably disposed within the said receptacle, said casing being provided with a projecting rib insertable within the recess in the wall of the receptacle, an electric motor located within the casing, and means for attaching the motor to the coupling on the drive shaft for the work performing member, said means including a motor shaft in axial alignment with the drive shaft for said work performing member, a coupling on the motor shaft, said motor shaft coupling having a tongue insertable within the recess on the coupling for the drive shaft of said work performing member.

References Cited in the file of this patent

UNITED STATES PATENTS

| | | |
|---|---|---|
| 1,303,011 | Aurand | May 6, 1919 |
| 1,316,027 | Halbreich | Sept. 16, 1919 |
| 1,779,031 | Casey | Oct. 21, 1930 |
| 2,122,611 | Kirby | July 5, 1938 |
| 2,519,526 | Wilber | Aug. 22, 1950 |
| 2,588,477 | Briggs | Mar. 11, 1952 |